(12) United States Patent
Sorensen (10) Patent No.: US 11,164,197 B2
(45) Date of Patent: Nov. 2, 2021

(54) SHOPPING TIME ALLOCATED TO PRODUCT EXPOSURE IN A SHOPPING ENVIRONMENT

(71) Applicant: Shopper Scientist LLC, Corbett, OR (US)

(72) Inventor: Herb Sorensen, Corbett, OR (US)

(73) Assignee: SHOPPER SCIENTIST LLC, Corbett, OR (US)

( * ) Notice: Subject to any disclaimer, the term of this patent is extended or adjusted under 35 U.S.C. 154(b) by 105 days.

(21) Appl. No.: 15/953,272

(22) Filed: Apr. 13, 2018

(65) Prior Publication Data

US 2019/0318372 A1 Oct. 17, 2019

(51) Int. Cl.
*G06Q 30/02* (2012.01)
(52) U.S. Cl.
CPC ..... *G06Q 30/0204* (2013.01); *G06Q 30/0201* (2013.01)
(58) Field of Classification Search
None
See application file for complete search history.

(56) References Cited

U.S. PATENT DOCUMENTS

| | | | | |
|---|---|---|---|---|
| 5,642,484 | A * | 6/1997 | Harrison, III | G06Q 30/0242 705/14.41 |
| 6,602,475 | B1 * | 8/2003 | Chiao | A61L 9/035 222/146.5 |
| 9,367,831 | B1 * | 6/2016 | Besehanic | G06Q 10/087 |
| 9,495,589 | B2 * | 11/2016 | Strombom | G06K 9/00604 |
| 9,747,497 | B1 * | 8/2017 | Sharma | G06Q 30/0201 |
| 9,911,290 | B1 * | 3/2018 | Zalewski | G06Q 20/12 |
| 2004/0111454 | A1 * | 6/2004 | Sorensen | G06Q 30/02 708/200 |
| 2004/0158676 | A1 * | 8/2004 | Kasmirsky | G06F 16/435 711/117 |
| 2005/0096936 | A1 * | 5/2005 | Lambers | H04N 21/2221 725/135 |

(Continued)

OTHER PUBLICATIONS

Sorensen, Herb Long tail media in the store, J of Advertising Research 48.3 pp. 329-338, 2008 (Year: 2008).*

(Continued)

*Primary Examiner* — Octavian Rotaru
(74) *Attorney, Agent, or Firm* — Alleman Hall Creasman & Tuttle LLP (57) ABSTRACT

A method for evaluating effective product visibility in a physical shopping environment including multiple products is provided. The method includes, in a data capture phase, counting a total number of shoppers for a period of time. For a first sample of shoppers, trip length is monitored to determine an average trip length. A second sample of shoppers is audited, and a viewing vector of audited shoppers is determined at each display visited. Displays visited are assigned at least one product category. In a following product category visibility analysis phase, from a total number of shoppers and the average trip length, the total shopping time for the physical shopping environment is calculated. The total shopping time is allocated to each viewing vector of audited shoppers to determine allocated time. From allocated time and the viewing vectors, an exposure value of the product category is determined. Non-display exposure values are also determinable.

20 Claims, 7 Drawing Sheets

(56) References Cited

U.S. PATENT DOCUMENTS

| | | | | |
|---|---|---|---|---|
| 2006/0200253 | A1* | 9/2006 | Hoffberg | G05B 15/02 700/19 |
| 2006/0200378 | A1* | 9/2006 | Sorensen | G06Q 30/0203 705/7.29 |
| 2006/0261157 | A1* | 11/2006 | Ostrowski | G06K 9/00 235/383 |
| 2006/0280315 | A1* | 12/2006 | Norris | H04R 1/403 381/77 |
| 2007/0271194 | A1* | 11/2007 | Walker | G06Q 50/188 705/80 |
| 2008/0018738 | A1* | 1/2008 | Lipton | G08B 13/1968 348/143 |
| 2008/0122926 | A1* | 5/2008 | Zhou | H04N 7/181 348/143 |
| 2008/0306756 | A1* | 12/2008 | Sorensen | G06Q 30/02 705/27.1 |
| 2009/0142031 | A1* | 6/2009 | Godtland | H04N 5/9201 386/278 |
| 2009/0183569 | A1* | 7/2009 | Aizawa | G01P 15/0922 73/504.15 |
| 2009/0271251 | A1* | 10/2009 | Sorensen | G06Q 30/02 348/14.01 |
| 2010/0217678 | A1* | 8/2010 | Goncalves | G06Q 20/203 705/22 |
| 2012/0185384 | A1* | 7/2012 | Pederson | G06Q 20/102 705/40 |
| 2013/0295964 | A1* | 11/2013 | Kang | G06Q 30/02 455/456.3 |
| 2014/0278655 | A1* | 9/2014 | Sorensen | G06Q 30/0201 705/7.17 |
| 2016/0110791 | A1* | 4/2016 | Herring | G01G 19/4144 705/26.61 |
| 2017/0169444 | A1* | 6/2017 | Housholder | G06Q 30/0261 |
| 2017/0278172 | A1* | 9/2017 | Dey | G06Q 30/0633 |
| 2017/0323376 | A1* | 11/2017 | Glaser | G06Q 20/203 |
| 2018/0065017 | A1* | 3/2018 | Murdock | A63B 69/36 |
| 2019/0172096 | A1* | 6/2019 | Tenant de la Tour | H04W 12/08 |

OTHER PUBLICATIONS

Sorensen, Herb Long tail media in the store, J of Advertising Research 48.3 pp. 329-338, 2008 http://www.journalofadvertisingresearch.com/content/48/3/329 https://www.shopperscientist.com/resources/sorensen-journal-publications/JAR_48_3_Sorensen-LongTailMediaInStore.pdf (Year: 2008).*

Herb Sorensen et al, Inside the Mind of the Shopper, First printing Aug. 2016 http://ptgmedia.pearsoncmg.com/images/9780134308920/samplepages/9780134308920.pdf (Year: 2016).*

Herb Sorensen, Mind of the Shopper, interview, youtube excerpt Sep. 7, 2018 https://www.youtube.com/watch?v=vUGIdhsF4Qo (Year: 2018).*

Sorenson, "Long Tail Media in the Store," Journal of Advertising Research, vol. 48, No. 3, Sep. 2008, 10 pages.

Sorensen, "The In-Store 'Audience,'" Journal of Advertising Research, vol. 49, No. 2, Jun. 2009, 4 pages.

Suher et al., "The Power of Atlas," Journal of Advertising Research, vol. 50, No. 1, Mar. 2010, 9 pages.

Phua et al., "Validating Bluetooth logging as metric for shopper behavior studies," Journal of Retailing and Consumer Services, vol. 22, Jan. 2015, 6 pages.

* cited by examiner

SHOPPING TIME ALLOCATED TO PRODUCT EXPOSURE IN A SHOPPING ENVIRONMENT

BACKGROUND

Retailers determining what products to offer and where to offer them in a retail environment may be met with various challenges. Without an understanding of how shoppers approach displays and products, it may be difficult for retailers to optimally display products. Retailers may find themselves disconnected from how shoppers perceive displays, let alone the overall impact that products and displays have on shoppers. Merely monitoring sales may be insufficient to provide a well-rounded understanding of shopper behavior. However, it may also be expensive and prohibitively time intensive to monitor a statistically significant portion of shoppers in order to make satisfactory conclusions of shopper perceptions and behavior. Even if approaches are made to monitor large samples of shoppers, a reliable method of retail analysis may be elusive. Improving the experiences of shoppers and the economic performance of stores remains an open-ended challenge.

SUMMARY

To address the above issues, a method for evaluating effective product visibility in a physical shopping environment including multiple products is provided. In a data capture phase, the method may include counting a total number of shoppers in the physical shopping environment for a period of time. For a first sample of shoppers, trip length may be monitored to determine an average trip length for the physical shopping environment. For a second sample of shoppers, the second sample of shoppers in the physical shopping environment may be audited to determine, at each display visited by an audited shopper, a viewing vector of the audited shopper. Auditing may be conducted by human observers in real-time or by way of video recording reviewed by auditors or analyzed using video recognition software. At least one product category may be assigned to each display visited by audited shoppers. A product category visibility analysis phase may follow the data capture phase. In the product category visibility analysis phase, the method may include, from the total number of shoppers and the average trip length, calculating a total shopping time for the physical shopping environment. The total shopping time may be allocated to each viewing vector of the audited shoppers to determine allocated time. From the allocated time and the viewing vectors, an exposure value of the product category may be determined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
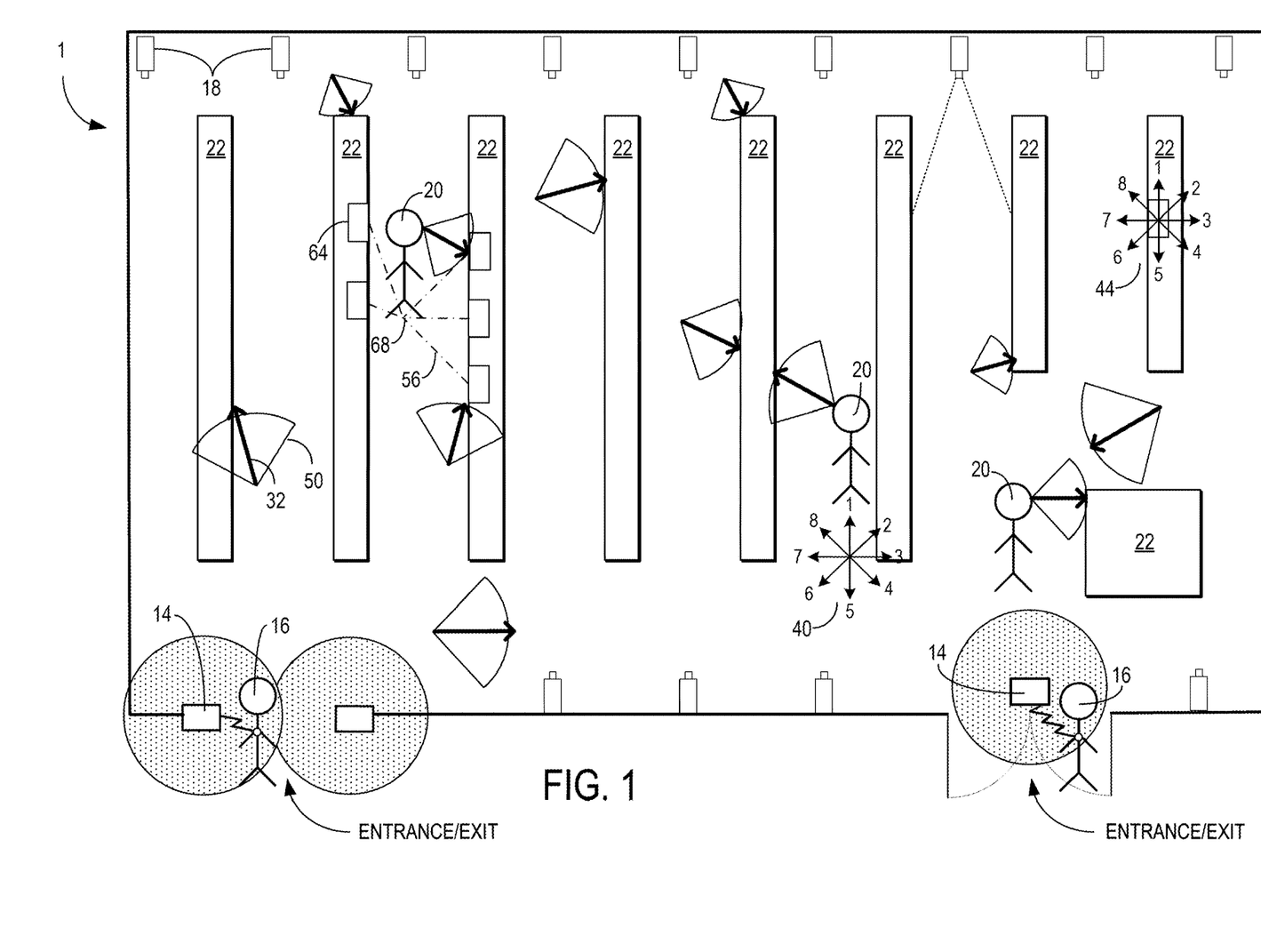
FIG. 1 is a rendering of a physical shopping environment including sensor systems to monitor samples of shoppers.

Systems and methods for evaluating effective product visibility in a physical shopping environment are disclosed herein. FIG. 1 schematically shows a physical shopping environment 1 including multiple products where shoppers are present. It will be appreciated that the physical shopping environment 1 may be, for example, a physical building serving as a retail location in which various products are offered for sale. Example physical merchant stores include supermarkets, convenience stores, clothing retailers, department stores, hardware stores, restaurants, bazaars, malls, etc.

A system 10 for evaluating effective product visibility in the physical shopping environment 1 may include a first sensor system 14 configured to detect a first sample of shoppers 16 entering and exiting the physical shopping environment 1, recording detected shoppers in the physical shopping environment 1 for a given period of time. Entrances/exits are designated in FIG. 1. The first sensor system 14 may be, in one example implementation, a system configured to detect wireless communications, such as those utilizing the BLUETOOTH® standard. Some of the shoppers that enter shopping environment 1 may possess short range wireless transmission devices on their person. In many circumstances short range wireless transmission devices are paired with other devices to provide wireless communication. For example, a mobile phone and a wireless earpiece may both utilize the BLUETOOTH® standard to wirelessly communicate via short range radio signals. As another example, a portable media player may wirelessly communicate with a wireless pair of headphones via short range radio signals. In an alternative implementation, the system 10 may employ WIFI® detectors to detect signals from shoppers that enter the physical shopping environment 1. Using this detection technology may work similarly to any number of similar wireless detection systems, although it will be appreciated that the first sample of shoppers 16 may include a different subset of shoppers depending on the types of devices the shoppers carry.

As shown in FIG. 1, a shopper entering or exiting a physical shopping environment 1 may pass within range of the first sensor system 14. While within range, the first sensor system 14 may detect a signal from the shopper. It will be appreciated that short range wireless transmission devices may be any of the aforementioned or any other short range wireless transmission devices, which emit transmissions with substantially unique characteristics that can be used to distinguish the transmissions of one shopper's device from another.

By utilizing a first sensor system 14 such as that described above, a first sample of shoppers 16 entering and exiting the physical shopping environment 1 may be recorded. FIG. 1 sketches possible configurations for placement of the first sensor system 14 at store entrances/exits. Shoppers within range of the first sensor system 14 may be detected both when entering and exiting the store, thus a length of time of a given shopping trip may be calculated. Average trip length for shoppers may be gleaned from this data, as described below. It has been established in prior research that in many stores, the ratio of all customers to the number of transaction logs is between 1.2 and 1.8, and the ratio of all customers to customers with active wireless devices that are trackable is 12:1 to 20:1. It will be appreciated that these values may depend on the type of wireless signal being detected, e.g., BLUETOOTH® or WIFI®. It will also be appreciated that the ratio of customers to transaction logs may be periodically checked for accuracy, as the types and number of devices emitting wireless signals carried by shoppers may change over time. These ratios may be utilized to compute crowd data and statistics and subsequently gain insight into properties of the shoppers in the physical shopping environment 1. For example, the frequency of shoppers shopping in groups or as individuals may be relevant to evaluating effective product visibility as described below. Trip length profiles may also yield insights into store structure as shopper movement around the physical shopping environment 1 alters the amount of time shoppers spend in the physical shopping environment 1.

To determine an aggregate number of shoppers in the physical shopping environment 1, electronic counters may be implemented. For example, wireless sensors using infrared (IR) beams may be placed at the entrances and/or exits of the physical shopping environment 1 to record a count of shoppers entering and exiting the physical shopping environment 1. Sensor data may be collected at various days and times to provide adequate counting of shoppers such that recorded values provide a statistically significant value for the total number of shoppers 58, which may be determined by an average number of shoppers moving through the store per unit time at different times of the day and the total time that the store is open to shoppers.

The system 10 may also include a second sensor system 18 configured to record a second sample of shoppers 20 visiting displays 22 in the physical shopping environment 1. The second sensor system 18 may be, in one example implementation, a system of video cameras placed within the physical shopping environment 1 at locations favorable to capturing a second sample of shoppers 20 interacting with the physical shopping environment 1. A second sensor system 18 of this nature is represented in FIG. 1. In one preferred implementation, not only are shoppers engaged in shopping within store aisles recorded, but shoppers at displays 22 placed around the store, moving from one location to another within the store, and engaged in non-shopping activities are recorded. It will be appreciated that the second sample of shoppers 20 is indeed a sample and need not include all of the shoppers in the physical shopping environment 1 at any given time.

Figure 2:
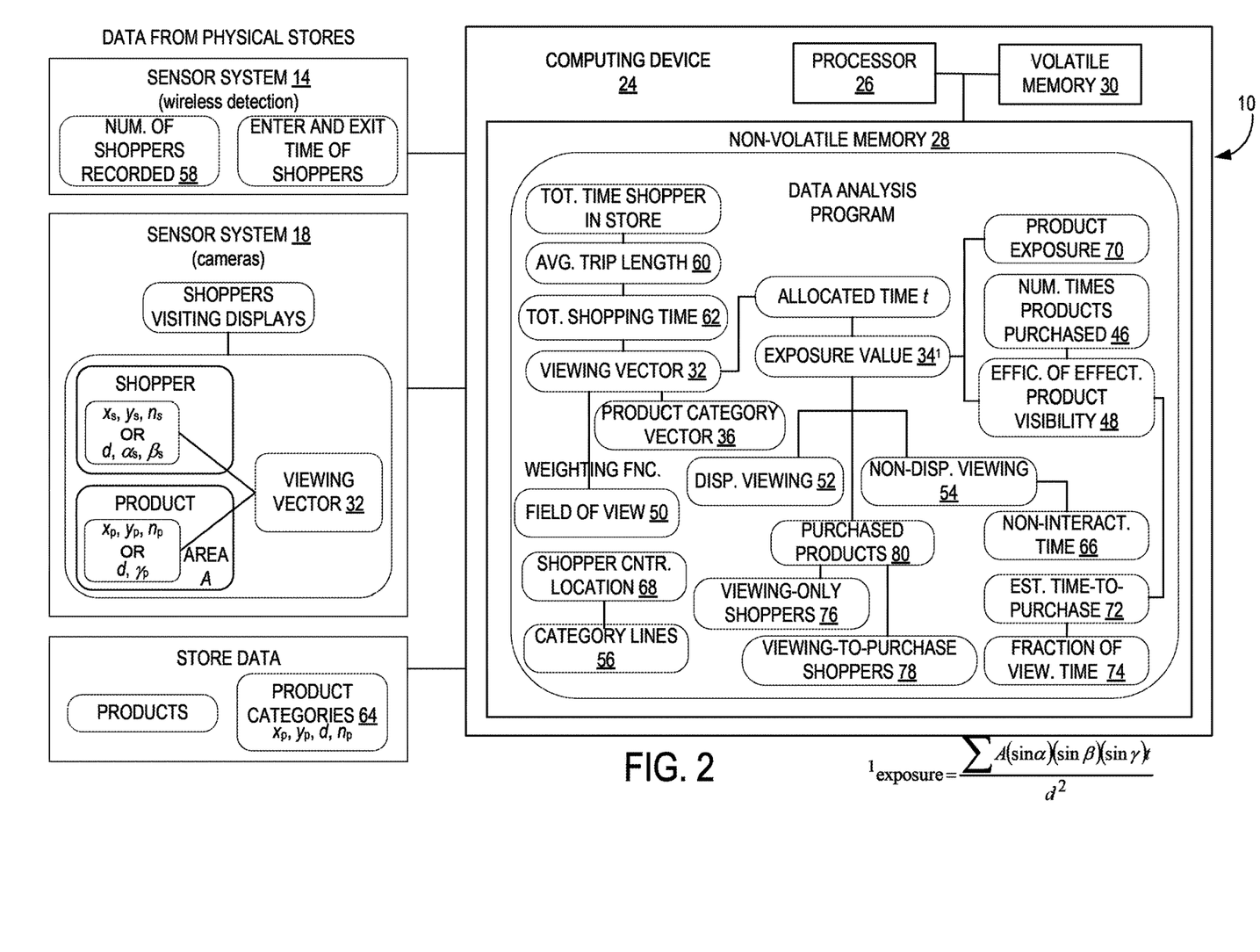
FIG. 2 is a schematic showing a system for evaluating effective product visibility in a physical shopping environment.

Incorporated into the system 10 may additionally be a computing device 24 including a processor 26. A schematic of one implementation of the system 10 incorporating the computing device 24 is shown in FIG. 2. The processor 26 may be connected to non-volatile memory 28 that may store programs as required by the system 10. A volatile memory 30 (e.g., RAM) may also connect to the processor 26 and non-volatile memory 28 (e.g., flash memory, hard drive, ROM, etc.) via a bus.

The system 10 may, via the processor 26, determine an amount of time each shopper in the first sample of shoppers 16 is in the physical shopping environment 1. This determination may be made from data output by the first sensor system 14. As described above, a first sample of shoppers 16 may be recorded at entrances/exits of the store, and since the signal of each shopper may be unique, a time of entrance and a time of exit at the store may be differentiated. An average trip length 60 for the physical shopping environment 1 may also be determined from this data. As also described above, an aggregate number of shoppers may be determined from using IR sensors to count shoppers. Therefore, starting from the total number of shoppers 58 and the average trip length 60, a total shopping time 62 for the physical shopping environment 1 may be determined. The total shopping time 62 may, for example, be calculated by multiplying the aggregate number of shoppers by the average trip length 60. The resulting value may be a total number of seconds associated with the presence of shoppers in the physical shopping environment 1. These "shopper seconds" may be used in subsequent calculations by the system 10.

It will be appreciated that data may be input to the system 10 for variables, parameters, and other information as needed by the system 10 to ultimately evaluate effective product visibility in the physical shopping environment 1. The second sample of shoppers 20 recorded by the second sensor system 18 may be analyzed outside of the system 10 either programmatically, for example by using video recognition software, or by human observers of the recorded video to identify position, head pose, and gaze direction of the shoppers in the recorded video. Alternatively, the second sample of shoppers 20 may be audited in-person by human observers in the physical shopping environment 1 to gain desired data regarding position, head pose, and gaze direction of shoppers. In such a case, the human observers audit the second sample of shoppers 20 in real-time, which may render the second sensor system 18 unnecessary. In one example implementation, the second sample of shoppers 20 is recorded by the second sensor system 18 in the form of video data. The video data may be reviewed by human observers, who manually audit the second sample of shoppers 20 by observing the video data and identify the position, head pose, and gaze direction of the shopper.

Figure 3A:
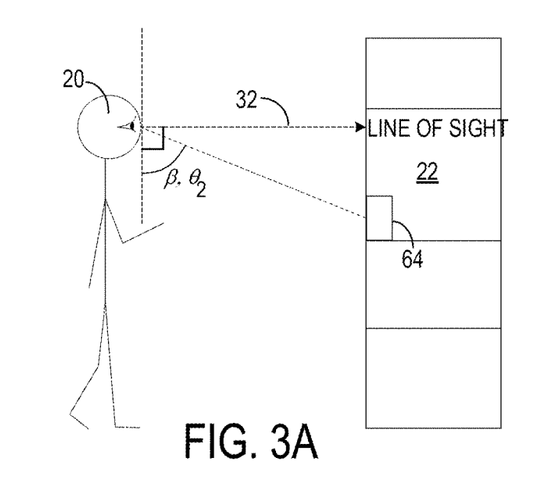
FIGS. 3A-3C depict a shopper in a physical shopping environment and variables for determination of an exposure value, including a viewing vector, according to one example implementation.
Figure 3B:
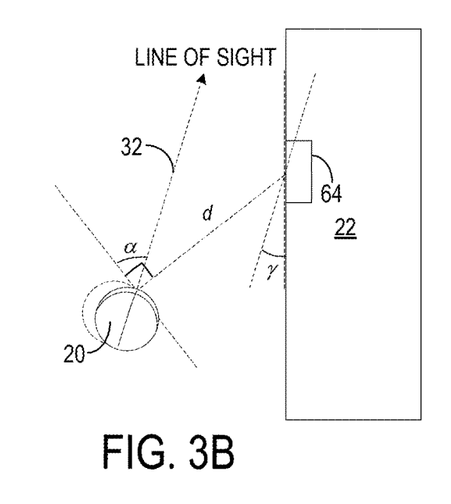
Figure 6:
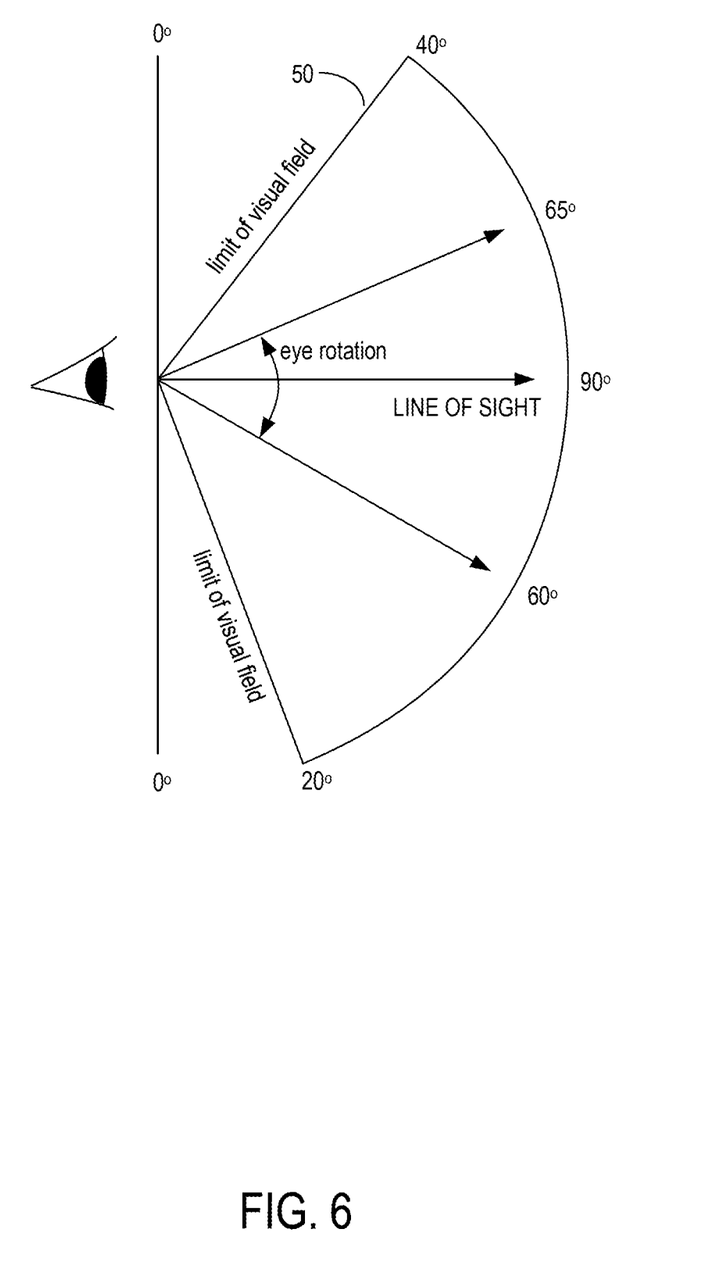
FIG. 6 shows an example field of view 50 in the vertical direction according to one implementation.

Data input to the system 10 may include viewing vectors 32 for audited shoppers in the recorded second sample of shoppers 20 visiting displays 22 in the physical shopping environment 1. The viewing vectors 32 may comprise a quantification of shopper gaze. That is, the viewing vectors 32 may be, in one implementation, length and direction of a shopper's gaze. One example of field of view 50 in the vertical direction is shown in FIG. 6, with 90° being a shopper's eye focused directly in front of the shopper. In one example, a shopper may be viewing a display 22, the shopper's gaze 0.5 meters from the display 22 and normal (at a 90° angle) to the front of the display 22, as indicated in FIG. 3A. Alternatively, the shopper's gaze may be 0.5 meters from the display 22 but angled away in the horizontal direction from the front of the display 22 as indicated in FIG. 3B. In another case, the shopper may be viewing a non-display space or object such as a shopping cart or other object of interest, in which case the viewing vector 32 may be determined with respect to the object being viewed. It will be appreciated that accounting for display exposure may allow discernment between display and non-display viewing periods of shoppers. In one implementation, exposure may be divided between display exposure and navigation exposure, or time spent by shoppers viewing objects and space that are not directly related to displays.

Also input to the system 10 may be product categories 64 for displays 22 visited by the audited shoppers. Using this data, the system 10 may allocate the total shopping time 62 to each viewing vector 32 of the audited shoppers. The output of this determination may be designated as allocated time t. From the allocated time t and the viewing vectors 32, the system 10 may determine an exposure value 34 for a given product category 64.

It will be appreciated that the exposure value 34 may be determined using various methods and may include formulas, algorithms and/or other calculations to the end that applicable and useful information may be supplied to retailers. It will be further appreciated that, while calculations and analysis may be conducted, the system 10 has one potential advantage of evaluating effective product visibility by the application of a method to the physical shopping environment 1 that culminates in recommended product choice and placement to the retailer as output. That is, the system 10 utilizes metrics such as the exposure value 34 to determine the offering and displaying of products to shoppers such that retailer profits and shopper satisfaction may be increased. Therefore, the system 10 presents a practice to be employed in retailing beyond mere data analysis, as described below and detailed in FIG. 2.

Figure 3C:
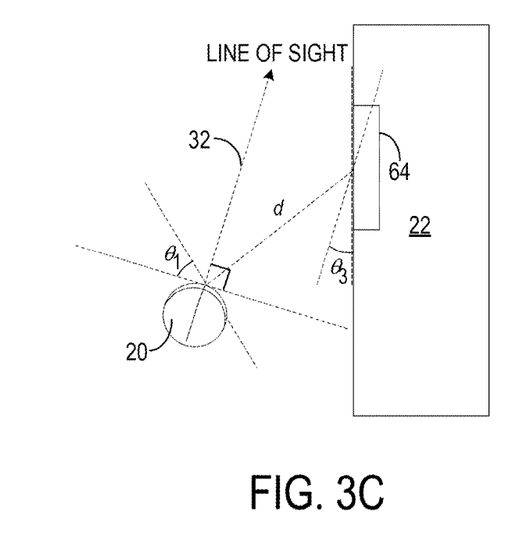

In one example implementation, the exposure value 34 may be determined by the following equation that is also included in FIG. 2:

$$\text{exposure} = \frac{\sum A(\sin\alpha)(\sin\beta)(\sin\gamma)t}{d^2} \quad \text{Equation 1}$$

where A is an area of a product or products in a display 22 assigned a product category 64, α is a peripheral angle relative to the shopper, β is an elevation angle relative to the shopper, γ is a rotation angle relative to the product or products, t is a time that may be allocated time t, and d is a distance between the shopper and the product or products of the product category 64. The summation in the equation may be a sum over viewing vectors 32 of audited shoppers. FIGS. 3A-3C show the relationship of these variables to a shopper and a product in one example implementation. From these diagrams, it may be seen that a line of sight is first determined for a given shopper, the shopper being audited by an observer either in real-time in a physical shopping environment 1 or by viewing recorded video data of the second sample of shoppers 20. A distance d between the audited shopper and the product or products having an area A on the display 22 may also be determined by the observer who is auditing, as shown for one example in FIGS. 3B and 3C.

From FIG. 3A, it may be seen that the angle β is an elevation angle between a line perpendicular to the line of sight and a direct line from the eye of the shopper to the products or products on the display 22. Referencing FIG. 3B, a line perpendicular to the distance d may be constructed. It will be appreciated that this perpendicular line would be tangent to the head of the shopper were the shopper facing along the line indicating the distance d, as represented by the dotted arc in FIG. 3B. The peripheral angle α may be between the perpendicular line and the line of sight as shown in FIG. 3B. The rotation angle γ may be between a line parallel to the line of sight and a line parallel to the plane of the area A, as shown in FIG. 3B.

To summarize, referencing the example implementation shown in FIGS. 3A-3C, data input to the system 10 for determination of the exposure value 34 of the product category 64 may include a distance d from the audited shopper to a respective display to which the product category 64 has been assigned, a peripheral angle α relative to the shopper and the respective display, and an elevation angle β relative to the shopper and the respective display. Furthermore, the data input to the system 10 may include a rotation angle γ of the respective display and an area A of the respective display.

It may be advantageous to apply empirical considerations to Equation 1. For example, shoppers tend to choose products for purchase when approximately ⅔ of a meter (2 feet) from a display. Therefore, dividing the sinusoidal values by the distance d of the shopper from the display may not give an accurate representation of product exposure in light of shopper behavior. Thus, the denominator of Equation 1 may be modified to be, for example, $(C+(d-0.67)^2)$, where d is still the distance d discussed above to the display, 0.67 m is the distance of maximum exposure, and C is a constant to avoid division by 0 when d=0.67 m. In this implementation, then, maximum exposure is moved from being when the shopper is at 0 distance from the display to when the shopper is at a more natural distance for shoppers to be, about 0.67 m from the display.

Figure 4:
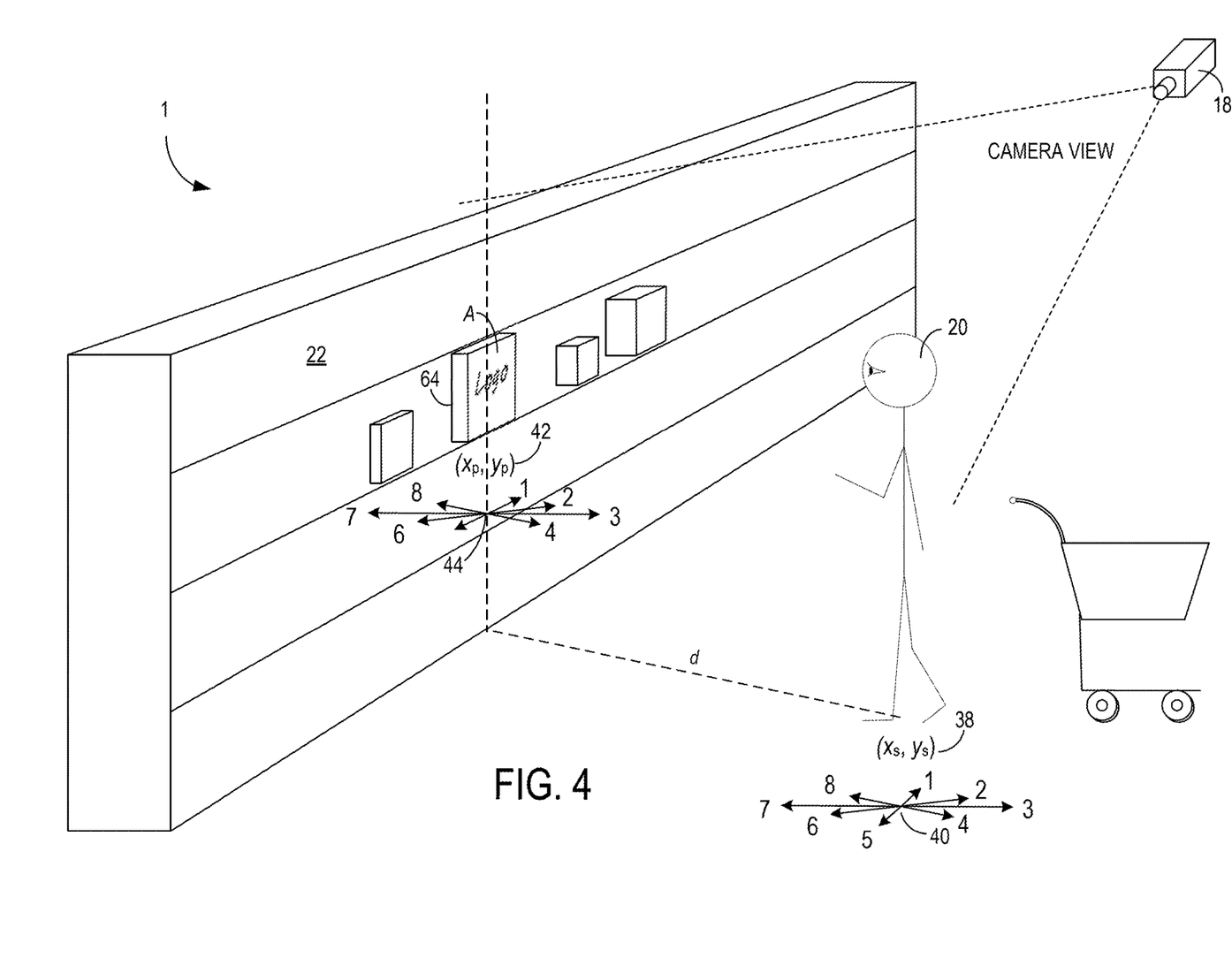
FIG. 4 depicts a shopper in a physical shopping environment and alternative variables for determination of an exposure value, according to another example implementation.

It will be appreciated that other methods may be employed when determining the exposure value 34. In another example implementation, the computing device 24 may be further configured to match the viewing vectors 32 to product category vectors 36. In this implementation, data input to the system 10 for determination of the exposure value 34 of the product category 64 may include a shopper coordinate location 38 and a shopper angular orientation 40 for each audited shopper. From the shopper coordinate location 38 and the shopper angular orientation 40, the viewing vector 32 may be determined. FIG. 4 demonstrates this method of determining the exposure value 34. As shown in the figure, the shopper coordinate location 38 in one example may be a coordinate designation of $(x_s, y_s)$, establishing a location of the shopper in the plane of the store. The shopper angular orientation 40 is shown, in this example implementation, to be a compass designation signified by an integer value $n_s$ ranging between 1 and 8. As shown, a 360° revolution of a compass is divided into eight equal parts and applied to the physical shopping environment 1 as a whole. An example compass is also displayed in FIG. 1 for a shopper angular orientation 40. Thus, each integer represents a 45° increment in the direction of the compass. In FIG. 4, the shopper may be assigned a shopper angular orientation 40 of 8, as the line of sight of the shopper may be most closely approximated by 315° on the compass in the figure.

It will be appreciated that measurement of a given angle for determination of exposure value 34 may be very precise or relatively general depending on the depth of information and customization of physical shopping environment 1 as sought by the retailer. Auditing shoppers to assign shopper angular orientation 40 that ranges from 1 to 8 on an 8-point circle may be more easily executed and repeated for a large sample of shoppers compared to measuring angular position and viewpoint more precisely for every sample shopper. While some retailers may require only a summary glance of the physical shopping environment 1, others may prefer more detailed work and subsequent insight. Angle measurement, therefore, is scalable in terms of precision to the preferred implementation of the method.

Product category vectors 36 for displays 22 visited by the audited shopper may also be included as data input to the system 10; each product category vector 36 may include a product category coordinate location 42 and a product category angular orientation 44 of the product category 64 at the displays 22 visited. The product category coordinate location 42 and the product category angular orientation 44 may be found similarly as the shopper coordinate location 38 and the shopper angular orientation 40 as described above, with a coordinate designation of $(x_p, y_p)$ for the product category coordinate location 42 and a compass designation signified by an integer value $n_p$ ranging between 1 and 8 for the product category angular orientation 44. A distance d from the audited shopper to the product category 64 at the displays 22 visited may also be included as data input to the system 10 in this example implementation.

Figure 5:
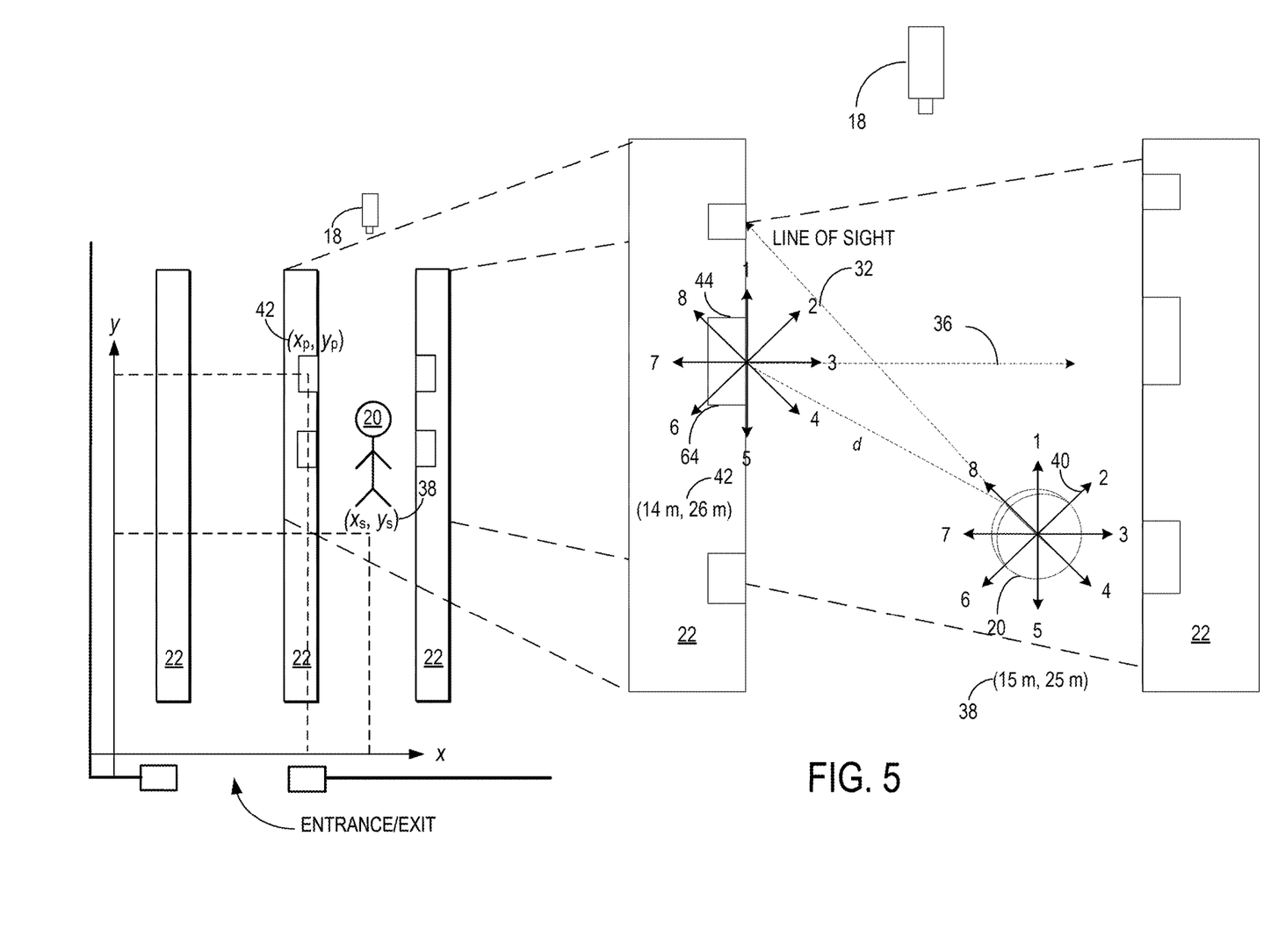
FIG. 5 shows a partial view of the physical shopping environment of FIG. 1 with a detailed view of a shopper and the alternative variables of FIG. 4.

Thus, having established these parameters, the viewing vector 32 of a given audited shopper and the product category vector 36 of a given product category 64 on a display 22 may be matched along the distance d. An illustrative example is presented in FIG. 5, which shows a partial view of the physical shopping environment 1 of FIG. 1 with a detailed view of an audited shopper from the second sample of shoppers 20. In FIG. 5, the method of determining exposure value 34 described above and displayed in FIG. 4 is again applied. The partial view from FIG. 1 demonstrates how a coordinate x-y axis may be chosen for the physical shopping environment 1 as a reference by which to determine shopper coordinate location 38 and product category coordinate location 42. In this instance, the origin of the coordinate system is placed at a corner of the physical shopping environment 1 near the entrance/exit.

As shown in the detailed view of FIG. 5, an audited shopper may have a viewing vector 32 defined by a shopper coordinate location 38 of, e.g., (15 meters, 25 meters) and a shopper angular orientation 40 of 8, which is the direction along which the shopper's line of sight falls. A product category 64 on a display 22 may have a product category vector 36 defined by a product category coordinate location 42 of, e.g., (14 meters, 26 meters) and a product category angular orientation 44 of 3, which is the direction the product category faces from its location in the display 22. The distance d between the audited shopper and the product category 64 on the display 22 may be 1.4 meters. However, because of their respective orientations, the audited shopper and the product category 64 on the display 22 have a 45° difference between their orientations. Therefore, in matching the viewing vector 32 to the product category vector 36, it may be determined that the exposure value 34 has a slightly lower value than a case where the audited shopper and the product category 64 on the display 22 have orientations that face each other directly, e.g., angular orientation of 8 for the audited shopper and angular orientation of 4 for the product category 64 on the display 22. However, the relative coordinate locations of the product category 64 and the shopper influence the exposure value as well. The value of the exposure value 34 may increase with a smaller distance d, for example, according to one example implementation.

Given the system 10 as described thus far, it will be appreciated that a significant advantage may be accomplished by its application. Conventional and known methods of product analysis have often required the monitoring of many individual shoppers through the duration of their shopping trips, thus providing an adequate amount of information to cumulatively assess their preferences toward various products and displays. This may be expensive and time consuming. The methods and systems here may provide the means to overcome these challenges. It has already been outlined how a total number of seconds, or amount of time, associated with the presence of shoppers in the physical shopping environment 1 may be garnered. Also, a demonstration of product exposure assessment has been given. Rather than monitoring each individual shopper to record as many shopper views, lines of sight, and the seconds spent on them as can be measured, the total amount of time measured using the first sensor system 14 for the first sample of shoppers 16 may be applied to the sampled viewing vectors 32 as audited from the second sample of shoppers 20.

As an illustrative example, 100,000 minutes per week of total shopping time 62 may be measured for a particular physical shopping environment 1. At the same store, 3,000 shoppers may be audited from a second sample of shoppers 20; in this example, one viewing vector 32 may be recorded for each audited shopper. After this data capture phase 98, each audited shopper may be taken to represent 1/3000 of the 100,000 minutes of total shopping time 62. As may be seen, this calculation assigns approximately 30 minutes of total shopping time 62 to the viewing vector 32 of each audited shopper. This is a critical step stemming in part from an assumption that the viewing vector 32 of an audited shopper represents a certain portion of unaudited shoppers taking a very similar view. Significantly, this step may allow conventional methods of monitoring shoppers to be greatly simplified, reducing time and expense in creating models of shopper behavior. Rather than monitoring each individual shopper's trip and assessing the shopper for each display viewed, a statistically significant number of viewing vectors 32 in the second sample of shoppers 20 may be recorded and assigned a portion of total shopping time 62.

Subsequently, an exposure value 34 for each viewing vector 32 may be assigned. This operation may be performed as discussed above in one example implementation, incorporating sine functions of angles defined relative to the shopper and using Equation 1. For example, an orientation 45° away from the viewing vector 32 along a horizontal (i.e., peripheral direction) forms an angle $\alpha$ as shown in FIG. 3B of 45°. If the shopper is viewing a point directly ahead along a horizontal line as shown in FIG. 3A, and a product for which exposure is being calculated is 45° below that line, the angle $\beta$ will also be 45°. Let it be assumed, in this example, that the angle $\gamma$ as shown in FIG. 3B is 10°, indicating that the display 22 is slightly rotated from being parallel to the line of sight of the shopper. If the area A of the product in the product category 64 being evaluated is 0.10 square meters and the distance d is 1 meter, then since $\sin(45°)=0.71$ and $\sin(10°)=0.17$ and 30 minutes of total shopping time 62 has been assigned to the viewing vector 32, the exposure value 34 given by Equation 1 above is 0.26 minutes. It will be appreciated that, were each of the angles $\alpha$, $\beta$, and $\gamma$ equal to 90° such that the shopper faces the product category 64 being evaluated face-on, the exposure value 34 is 3 minutes. Therefore, it may be seen that exposure value 34 weakens the farther a product category 64 being evaluated is from the shopper's line of sight. It will be further appreciated that the exposure value 34 may be multiplied by other factors to derive other variables relevant to the shopper, such as the strength of a particular display 22 may have on a shopper. This may take the form of placing an additional multiplicative factor in Equation 1, the multiplicative factor being an empirically derived shopper impact factor that may be drawn from psychological or sensory data. Thus, determining an impression value of the product category may be executed by multiplying the exposure value by an empirically derived shopper impact factor for the product category.

It will be appreciated that the impression value may be quantified through a number of empirical means. In one implementation, eye-tracking may be employed to analyze shopper gaze and point of focus when a shopper is presented with an array of products, for example on a test table, that may vary in type, presentation style, and/or packaging. Data from the physical shopping environment 1 may be combined with Equation 1 in the form a multiplicative factor that represents a shopper impact factor. This impact factor may take the form of a normalized value representing assigned actual dollar sales for an item or number of sales for an item.

In another example, if a shopper is audited and found to have a field of view 50 that includes some products that were tested in eye-tracking experiments, the exposure value 34 for a higher-rated product category may be multiplied by a higher value to calculate impression value than a lower-rated product category where the higher-rated and lower-rated product categories have similar locations within the field of view 50. In one implementation, A/B testing may be used to establish products and product categories that are more effective in gaining shopper attention and thus have a higher shopper impact factor. For product categories that test as more effective in eye-tracking experiments on shoppers in the physical shopping environment 1 or in A/B testing, a higher multiplicative factor may be applied to exposure value 34 when a shopper in the physical shopping environment 1 is audited to have a field of view 50 including those product categories. Likewise, products belonging to other product categories that also fall in the range of the shopper's field of view 50 but that were less effective in eye-tracking experiments or in A/B testing may be assigned a lower multiplicative factor when calculating impression value from exposure value 34. In this manner, a retailer may further determine from the impression value a quantification of how product placement within displays affects packaging, product type, or other product attributes known from prior testing to be effective (or not) in gaining shopper attention.

Once the parameters and variables as described above have been established, the system 10 may be utilized to apply learnings from shopper driven practices to modify the retailing system itself. In a concrete sense, the exposure values 34 may be employed to discern display viewing and non-display viewing by shoppers spending time (or not spending time) at displays 22 as described in detail below. If the viewing vector 32 is not directed to display space, as depicted in FIG. 3B, non-display space is assigned greater exposure than products in the display 22 and thus more viewing time is attributed to non-display space. This factor may be important in determining an appropriate distribution of shopper time (and attention) in a physical shopping environment 1. Exposure may be relative to display exposure or navigation exposure, which may include interludes between product interactions, exposure to non-display space, and navigation time through the physical shopping environment 1. By additionally incorporating values such as time-to-purchase for products, a retailer may gain a potential advantage in customizing a physical shopping environment 1 to the retailer's preference for serving shoppers from known distributions of shopper time.

FIG. 2 displays the system 10 according to one example implementation that demonstrates some of the potential advantages that may be applied to a physical shopping environment 1. The computing device 24 may be configured to monitor a number of times products are purchased 46, and from the number of times products are purchased 46 and the exposure value 34 of the product category 64, determine an efficiency for evaluating effective product visibility 48. In one example implementation, transaction logs may be employed to ascertain what products are purchased and how often those products are purchased. At the most rudimentary, a correlation may be established between the exposure values 34 for various product categories 64 and the number of times products are purchased 46. In a more sophisticated example method, one product category 64 may be exchanged for another product category 64 in a given display 22 in the store, the correlations between exposure values 34 and the number of times products from each product category 64 compared. One potential advantage of this method is that retailers may create a hierarchy for product placement in the physical shopping environment 1 from within a concrete, quantifiable system. The system 10 may not only reveal products for which shoppers have shown preferences, but the system 10 may provide the elements manipulable by the retailer to further refine display of those products to boost sales further. For example, if one variety of snacks is shown to garner shopper attention via the system 10, yet the snacks are not placed at an ideal area in the field of view 50 of the shopper, the retailer may decide to move the preferred snacks to a more central area of the field of view 50 of the shopper. In reference to FIG. 6, the snacks may be moved from below the level of eye rotation (below 60°) and placed more directly in the shopper's line of sight (at 90°). Alternatively, one type of product, e.g., vinegars and dressings, may be relocated or switched with another type of product, e.g., boxed instant foods.

The computing device 24 may be configured to compute a sinusoidal function of each of the peripheral angle $\alpha$ relative to the shopper and the respective display, the elevation angle $\beta$ relative to the shopper and the respective display, and the rotation angle $\gamma$ of the respective display, as described at Equation 1 above. This formulation may be used to weight a field of view 50 of each audited shopper, the viewing vector 32 assigned a heavier weight with decreasing weight farther from the viewing vector 32 according to the sinusoidal functions.

FIG. 3C demonstrates a similar formulation as one example of how a field of view 50 may be constructed for an audited shopper. Once the line of sight is established by an auditor, a line perpendicular to the line of sight may be constructed as shown. The field of view 50 may be, for example, considered as including the 180° range in front of the shopper with the line of sight bisecting the 180° angle. It may be understood that display content may have a lessening impact on the shopper the greater its angular displacement from the line of sight. The angle $\theta_1$ may be constructed between the line perpendicular to the line of sight and a line perpendicular to the distance d from the shopper to a given product category 64 on a display 22. This construction sets the product category 64 and the display 22 as a reference location for the weighting of the field of view 50. It will be appreciated that the weighting of the field of view 50 may be executed via a weighting function, statistical program, or other method as appropriate. An increase in the angle $\theta_1$ corresponds to a greater potential impact for a given point in the shopper's field of view 50. Likewise, the angle $\theta_3$ may be considered in weighting the field of view 50, which is equivalent to the rotation angle $\gamma$ as shown in FIGS. 3B and 3C. As may be understood from FIG. 3C, a larger value of the angle $\theta_3$ corresponds to an increase in the amount by which the display 22 faces the shopper, thus potentially increasing the impact of its contents.

The field of view 50 may additionally account for elevation as a third dimension, as shown in FIG. 3A. The angle $\theta_2$, which may be composed similarly to angle $\beta$ as described above, may assign a greater potential impact of a location angularly closer to the shopper's line of sight as its value becomes larger. Therefore, the angles $\theta_1$, $\theta_2$, and $\theta_3$ may be garnered in one example implementation to weight a field of view 50 of each audited shopper. While the raw angles may be given as weights, trigonometric functions may be applied to the angles as well; as depicted in FIGS. 3A and 3C, the sine of each angle $\theta_1$, $\theta_2$, and $\theta_3$ would be reasonable to assign greater or lesser potential impact of locations within the shopper's field of view 50.

From weighting the field of view 50 of each audited shopper, the exposure value 34 may be parsed into display viewing 52 and non-display viewing 54 for each audited shopper. As a potentially natural extension of weighting the field of view 50, locations within the field of view 50 of the shopper that fall on display space may be accounted as display viewing 52, while locations within the field of view 50 that fall on non-display space may be accounted as non-display viewing 54. For example, if the floor, ceiling, empty aisle space, or other non-display space constitutes a majority of the field of view 50 of the shopper, a large weighting may be given to non-display viewing 54.

As a further extension, the computing device 24 may be further configured to determine an estimated non-interaction time with products 66 for shoppers from the determination and parsing of the exposure value 34. Quantifying non-interaction time with products 66 may be significant to retailers interested in discerning the objects of shopper attention. As an example application, retailers may desire to more effectively use non-display space in the physical shopping environment 1 and may be guided in doing so by a better understanding of shopper time spent on displays 22 and that not spent on displays 22.

The computing device 24 may be further configured to designate the shopper coordinate location 38 of each audited shopper as a shopper center location 68 and orient category lines 56 for the product categories 64 as originating from the shopper center locations 68. FIG. 1 shows one example implementation of orienting category lines 56. In this example implementation, shopper coordinate locations 38 with coordinate designations of $(x_s, y_s)$ for audited shoppers are matched to $(x_p, y_p)$ for products in displays 22 being evaluated. Category lines 56 are then constructed between the coordinate points. One potential advantage of this approach is that product maps of the physical shopping environment 1 may be simplified to only relevant locations, replacing extensive maps of product catalogues.

The computing device 24 may be further configured to subdivide the exposure value 34 for at least one product category 64 into a product exposure value 70 for at least one product within the displays 22 visited by the audited shoppers. Thus far, an evaluation of product categories 64 has been given without attention to individual products within the product categories 64. In one example implementation, a retailer may desire further detail to evaluate shopper behavior at the product level. Executing the system 10 at the product category level may require less intensive computation, time and expense; however, once the product category level has been understood, it may be a relatively easy extension to probe further and apply system 10 with greater precision. Therefore, delineating exposure at the product level may be possible.

The computing device 24 may be further configured to, when determining the efficiency for evaluating effective product visibility 48, and from the allocated time t and an estimated time-to-purchase 72, determine a fraction of viewing time associated with purchases 74. As described above, transaction logs may be examined to determine information about what products are purchased. In one example implementation, an estimated time-to-purchase 72 for various products may be acquired from additional research or external evaluation of the system 10. With estimated time-to-purchase 72 as an additional input to the system 10, it may be determined, from subtracting estimated time-to-purchase 72 from allocated time t, what fraction of viewing time spent by shoppers is actually devoted to purchases. This has one potential advantage of lending a retailer greater information for product and display placement. For example, if it is determined that shoppers are spending an average of 40 or more seconds per shopper on a popular product, the retailer may alter the display of the product to reduce the amount of time that shoppers spend on choosing that product, thereby expediting a shopper's experience and potentially allowing the shopper more time to view other displays of other products.

The computing device 24 may be further configured to correlate viewing vectors 32 and allocated time t with purchased products 80, and per product category 64, divide shoppers between viewing-only shoppers 76 and viewing-to-purchase shoppers 78. As an extension of the description above, once shopper time is allocated to products and the fraction of viewing time associated with purchases 74 known, a division may be made between a portion of shoppers who only view products on the displays 22 and a portion of shoppers who view and subsequently purchase the products viewed. This information may be critical to retailers who desire to increase, from the number of shoppers who view a particular product, the percentage of those shoppers who actually purchase the product.

Figure 7:
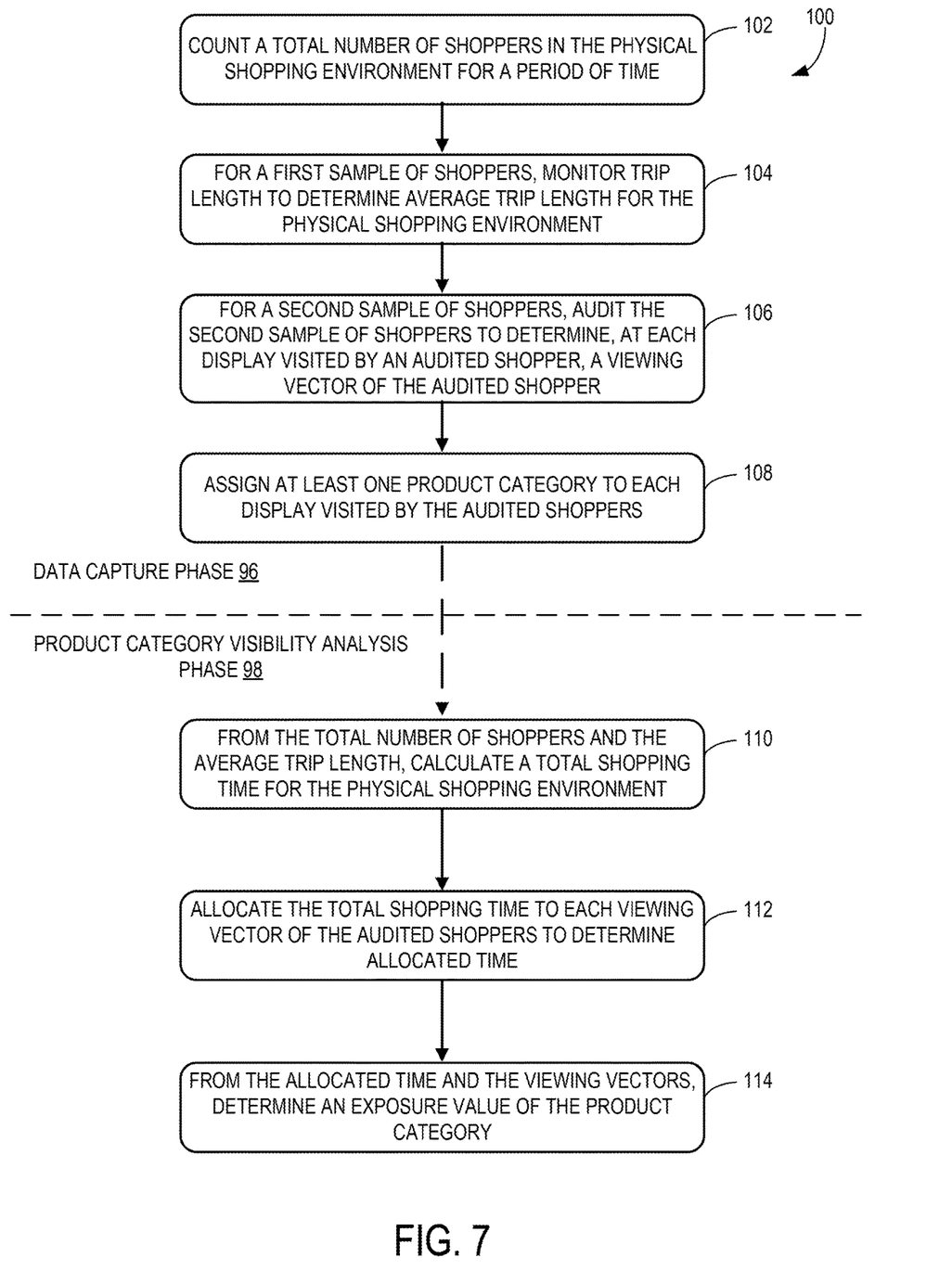
FIG. 7 is a flowchart of a method for evaluating effective product visibility in a physical shopping environment according to one embodiment of the present disclosure.

FIG. 7 illustrates a method 100 for evaluating effective product visibility in a physical shopping environment 1 including multiple products. In a data capture phase 98, the method 100 may include at 102 counting a total number of shoppers 58 in the physical shopping environment 1 for a period of time. At 104, the method 100 may include, for a first sample of shoppers, monitoring trip length to determine an average trip length 60 for the physical shopping environment 1. The method 100 at 106 may include, for a second sample of shoppers, auditing the second sample of shoppers in the physical shopping environment 1 to determine, at each display 22 visited by an audited shopper, a viewing vector 32 of the audited shopper. At 108, the method 100 may include assigning at least one product category 64 to each display 22 visited by the audited shoppers. Following the data capture phase 98, a product category visibility analysis phase 96 may also be included in the method 100. The method 100 at 110 may include, from the total number of shoppers 58 and the average trip length 60, calculating a total shopping time 62 for the physical shopping environment 1. At 112, the method 100 may include allocating the total shopping time 62 to each viewing vector 32 of the audited shoppers to determine allocated time t. The method 100 at 114 may include, from the allocated time t and the viewing vectors 32, determining an exposure value 34 of the product category 64.

The method 100 may further include, as described above, data input to the system 10 for determination of the exposure value 34 of the product category 64. This data may include a distance d from the audited shopper to a respective display to which the product category 64 has been assigned, a peripheral angle α relative to the shopper and the respective display, and an elevation angle β relative to the shopper and the respective display. The data input to the system 10 may also include a rotation angle γ of the respective display and an area A of the respective display. The computing device 24 may be further configured to match the viewing vectors 32 to product category vectors 36. In this implementation, data input to the system 10 for determination of the exposure value 34 of the product category 64 may include a shopper coordinate location 38 and a shopper angular orientation 40 for each audited shopper. From the shopper coordinate location 38 and the shopper angular orientation 40, the viewing vector 32 may be determined. Product category vectors 36 for displays 22 visited by the audited shopper may also be included as data input to the system 10; each product category vector 36 may include a product category coordinate location 42 and a product category angular orientation 44 of the product category 64 at the displays 22 visited. In this implementation, a distance d from the audited shopper to the product category 64 at the displays 22 visited may also be included as data input to the system 10.

The computing device 24 may be configured to monitor a number of times products are purchased 46, and from the number of times products are purchased 46 and the exposure value 34 of the product category 64, determine an efficiency for evaluating effective product visibility 48. The computing device 24 may be configured to compute a sinusoidal function of each of the peripheral angle α relative to the shopper and the respective display, the elevation angle β relative to the shopper and the respective display, and the rotation angle γ of the respective display, as described above. This formulation may be used to weight a field of view 50 of each audited shopper, the viewing vector 32 assigned a heavier weight with decreasing weight farther from the viewing vector 32 according to the sinusoidal functions. From weighting the field of view 50 of each audited shopper, the exposure value 34 may be parsed into display viewing 52 and non-display viewing 54 for each audited shopper.

The method 100 may further include the computing device 24 configured to determine an estimated non-interaction time with products 66 for shoppers from the determination and parsing of the exposure value 34. The computing device 24 may be further configured to designate the shopper coordinate location 38 of each audited shopper as a shopper center location 68 and orient category lines 56 for the product categories 64 as originating from the shopper center locations 68. The computing device 24 may be further configured to subdivide the exposure value 34 for at least one product category 64 into a product exposure value 70 for at least one product within the displays 22 visited by the audited shoppers.

Also included in the method 100 may be the computing device 24 configured to, when determining the efficiency for evaluating effective product visibility 48, and from the allocated time t and an estimated time-to-purchase 72, determine a fraction of viewing time associated with purchases 74. The computing device 24 may be further configured to correlate viewing vectors 32 and allocated time t with purchased products 80, and per product category 64, divide shoppers between viewing-only shoppers 76 and viewing-to-purchase shoppers 78. The method 100 may include determining an impression value of the product category 64 by multiplying the exposure value 34 by an empirically derived shopper impact factor for the product category 64, as described above.

The methods and systems described herein provide a mechanism for retailers to monitor and evaluate a shopping environment and systematically implement quantifiable changes that has potential advantages over conventional methods without excessive time and expense. Former methods of merely tracking shopping carts to analyze shoppers yielded inadequate information. By monitoring two separate samples of shoppers, data from each may be combined to reduce the overall amount of data that may be required to construct useful manipulations of the shopping environment. Allocating shopping time to viewing vectors and fields of view of shoppers to determine product exposure furnishes a retailer with an array of options to further determine shopper interaction times with products, viewing time portions that are involved with purchasing, and impact of product exposure. As a result, retailers may precisely arrange the shopping environment by manipulating quantifiable parameters that evokes predictable changes in shopper response and, potentially, builds a more efficient environment for both shoppers and retailers alike.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for evaluating effective product visibility in a physical shopping environment including multiple products, the method comprising:
   in a data capture phase, executing instructions of a computer, comprising:
   counting a total number of shoppers in the physical shopping environment for a period of time;
   for a first sample of shoppers, monitoring trip length of time of each of the first sample of shoppers via one or more sensors of a first sensor type provided at one or more respective entrances and exits of the physical shopping environment to determine an average trip length of time for the physical shopping environment, the one or more sensors of the first sensor type configured to detect wireless communications from mobile devices carried by the first sample of shoppers entering and exiting the physical shopping environment;
   for a second sample of shoppers, auditing the second sample of shoppers in the physical shopping environment via one or more sensors of a second sensor type to determine, at each display visited by an audited shopper, a viewing vector from a field of view detected from a gaze of the audited shopper, wherein the second sensor type differs from the first sensor type and includes a camera;
   assigning a viewing angle, selected from among a plurality of predefined viewing angles, to the audited shopper based on the determined viewing vector of the audited shopper; and assigning at least one product category to each display visited by the audited second sample of shoppers;

following the data capture phase, a product category visibility analysis phase executing subsequent instructions of the computer, comprising:

from the total number of shoppers and the average trip length of time, calculating a total shopping time for the physical shopping environment;

allocating the total shopping time to each assigned viewing angle of the audited second sample of shoppers to determine allocated time; and from the allocated time and each of the assigned viewing angles, determining an exposure value of a subject product category of the at least one product category by:

determining a product category vector, among respective product category vectors, for the subject product category, each product category vector including a product category coordinate location of the at least one product category at the displays visited and a product category angular orientation of the at least one product category at the displays visited, wherein the product category angular orientation is a direction the subject product category faces from the product category coordinate location, and matching, one or more of each of the assigned viewing angles to the product category vector, wherein the exposure value for the subject product category is based on the one or more assigned viewing angles that are matched to the product category vector and the allocated time of the one or more assigned viewing angles.

2. The method of claim 1, wherein determination of the exposure value of the at least one product category includes:

determining a distance from the audited shopper to a respective display to which the at least one product category has been assigned, a peripheral angle relative to the shopper and the respective display, and an elevation angle relative to the shopper and the respective display, determining a rotation angle of the respective display; and determining an area of the respective display.

3. The method of claim 1, wherein determination of the exposure value of the at least one product category includes:

determining the viewing vector from a shopper coordinate location and a shopper angular orientation for each audited shopper;

determining the respective product category vectors for each display visited by the audited shopper; and determining a distance from the audited shopper to the at least one product category at the displays visited.

4. The method of claim 1, further comprising:

monitoring a number of times products are purchased; and from the number of times products are purchased and the exposure value of the at least one product category, determining an efficiency for evaluating effective product visibility.

5. The method of claim 2, further comprising:

computing a sinusoidal function of the peripheral angle relative to the shopper and the respective display, the elevation angle relative to the shopper and the respective display, and the rotation angle of the respective display, to weight the field of view of each audited shopper, the viewing vector assigned a heavier weight with decreasing weight farther from the viewing vector according to the sinusoidal function; and parsing the exposure value into display viewing and non-display viewing for each audited shopper from the weighting of the field of view of each audited shopper.

6. The method of claim 5, further comprising determining an estimated non-interaction time with products for a subset of shoppers from the determination of the exposure value and parsing of the exposure value.

7. The method of claim 3, further comprising designating the shopper coordinate location of each audited shopper as a shopper center location, and orienting category lines for the at least one product category as originating from the shopper center locations.

8. The method of claim 1, further comprising subdividing the exposure value for the at least one product category into a product exposure value for at least one product within displays visited by the audited shoppers.

9. The method of claim 4, determining the efficiency for evaluating effective product visibility further comprising:

from the allocated time and an estimated time-to-purchase, determining a fraction of viewing time associated with purchases.

10. The method of claim 9, further comprising:

correlating viewing vectors and the allocated time with purchased products; and per product category, dividing shoppers between viewing-only shoppers and viewing-to-purchase shoppers.

11. The method of claim 1, further comprising:

determining an impression value of the at least one product category by multiplying the exposure value by an empirically derived shopper impact factor for the at least one product category.

12. A system for evaluating effective product visibility in a physical shopping environment including multiple products, the system comprising:

a first sensor system configured to detect, via one or more sensors of a first sensor type provided at one or more respective entrances and exits of the physical shopping environment, a first sample of shoppers entering and exiting the physical shopping environment and record a total number of shoppers in the physical shopping environment for a period of time, the one or more sensors of the first sensor type configured to detect wireless communications from mobile devices carried by the first sample of shoppers entering and exiting the physical shopping environment;

a second sensor system configured to record, via one or more sensors of a second sensor type, a second sample including a plurality of audited shoppers visiting displays in the physical shopping environment, wherein the second sensor type differs from the first sensor type and includes a camera; and a computing device including a processor configured to:

determine, from data output by the first sensor system, an amount of time each shopper in the first sample of shoppers is in the physical shopping environment and an average trip length of time for the physical shopping environment;

determine, from the total number of shoppers and the average trip length of time, a total shopping time for the physical shopping environment;

determine, at each display visited by an audited shopper of the plurality of audited shoppers included in the second sample, a viewing vector from a field of view detected from a gaze of the audited shopper, and assign a viewing angle, selected from among a plurality of predefined viewing angles, to the audited shopper based on the determined viewing vector of the audited shopper;

assign at least one product category to each display visited by the audited shoppers of the second sample;

using data input to the system including the assigned viewing angles for the audited shoppers in the second sample of shoppers and the at least one product category for the displays visited by the audited shoppers, allocate the total shopping time to each assigned viewing angle of the audited shoppers to determine allocated time; and from the allocated time and the assigned viewing angles, determine an exposure value of a subject product category of the at least one product category by:

determining a product category vector, among respective product category vectors, for the subject product category, each product category vector including a product category coordinate location of the at least one product category at the displays visited and a product category angular orientation of the at least one product category at the displays visited, wherein the product category angular orientation is a direction the subject product category faces from the product category coordinate location, and matching one or more of the assigned viewing angles identified from auditing the second sample of shoppers to the product category vector, wherein the exposure value for the subject product category is based on the one or more assigned viewing angles that are matched to the product category vector and the allocated time of the one or more assigned viewing angles.

13. The system of claim 12, wherein data input to the system for determination of the exposure value of the at least one product category includes:

a distance from the audited shopper to a respective display to which the at least one product category has been assigned, a peripheral angle relative to the shopper and the respective display, and an elevation angle relative to the shopper and the respective display, a rotation angle of the respective display; and an area of the respective display.

14. The system of claim 12, wherein data input to the system for determination of the exposure value of the at least one product category includes:

a shopper coordinate location and a shopper angular orientation for each audited shopper, from which the viewing vector is determined;

the respective product category vectors for displays visited by the audited shopper; and a distance from the audited shopper to the at least one product category at the displays visited.

15. The system of claim 12, wherein the computing device is further configured to:

monitor a number of times products are purchased; and from the number of times products are purchased and the exposure value of the at least one product category, determine an efficiency for evaluating effective product visibility.

16. The system of claim 13, wherein the computing device is further configured to:

compute a sinusoidal function of the peripheral angle relative to the shopper and the respective display, the elevation angle relative to the shopper and the respective display, and the rotation angle of the respective display;

weight the field of view of each audited shopper, the viewing vector assigned a heavier weight with decreasing weight farther from the viewing vector according to the sinusoidal function; and parse the exposure value into display viewing and non-display viewing for each audited shopper from the weighting of the field of view of each audited shopper.

17. The system of claim 16, wherein the computing device is further configured to determine an estimated non-interaction time with products for a subset of shoppers from the determination of the exposure value and parsing of the exposure value.

18. The system of claim 12, wherein the computing device is further configured to subdivide the exposure value for the at least one product category into a product exposure value for at least one product within the displays visited by the audited shoppers.

19. The system of claim 15, wherein the computing device is further configured to, when determining the efficiency for evaluating effective product visibility, from the allocated time and an estimated time-to-purchase, determine a fraction of viewing time associated with purchases.

20. The system of claim 19, wherein the computing device is further configured to:

correlate viewing vectors and the allocated time with purchased products; and per product category, divide shoppers between viewing-only shoppers and viewing-to-purchase shoppers.

* * * * *